United States Patent
Subbotin

(10) Patent No.: US 7,639,937 B2
(45) Date of Patent: Dec. 29, 2009

(54) METHOD AND APPARATUS FOR AUTO FOCUSING AN IMAGING DEVICE

(75) Inventor: Igor Subbotin, South Pasadena, CA (US)

(73) Assignee: Aptina Imaging Corporation, Grand Cayman (KY)

(*) Notice: Subject to any disclaimer, the term of this patent is extended or adjusted under 35 U.S.C. 154(b) by 336 days.

(21) Appl. No.: 11/176,284

(22) Filed: Jul. 8, 2005

(65) Prior Publication Data
US 2007/0009248 A1 Jan. 11, 2007

(51) Int. Cl.
G03B 3/00 (2006.01)

(52) U.S. Cl. .............. 396/102; 396/121; 382/171; 382/172; 382/173; 382/272; 382/273

(58) Field of Classification Search .......... 396/121, 396/102; 382/168, 171, 172, 173, 270, 272, 382/273
See application file for complete search history.

(56) References Cited

U.S. PATENT DOCUMENTS

| | | | |
|---|---|---|---|
| 4,796,043 A * | 1/1989 | Izumi et al. ............ 396/121 |
| 4,878,079 A * | 10/1989 | Hamada et al. .......... 396/121 |
| 4,899,194 A * | 2/1990 | Hori ...................... 355/56 |
| 5,003,165 A * | 3/1991 | Sarfati et al. ........... 250/201.2 |
| 5,040,228 A * | 8/1991 | Bose et al. ............. 382/141 |
| 6,140,630 A | 10/2000 | Rhodes |
| 6,204,524 B1 | 3/2001 | Rhodes |
| 6,310,366 B1 | 10/2001 | Rhodes et al. |
| 6,326,652 B1 | 12/2001 | Rhodes |
| 6,333,205 B1 | 12/2001 | Rhodes |
| 6,376,868 B1 | 4/2002 | Rhodes |

OTHER PUBLICATIONS

Co-pending U.S. Appl. No. 11/354,126.*

* cited by examiner

*Primary Examiner*—Patrick J Assouad
*Assistant Examiner*—Michael A Strieb
(74) *Attorney, Agent, or Firm*—Dickstein Shapiro LLP

(57) ABSTRACT

A method and apparatus for accurately auto focusing a lens of an imaging device. In an exemplary embodiment, an imaged scene is split into an array of zones. The minimum and maximum sharpness score for each zone is determined over a plurality of lens positions. A histogram of the lens positions of the corresponding maximum sharpness score for each zone is created. The peak of the histogram is determined to be the best focus position for a given scene.

22 Claims, 4 Drawing Sheets

METHOD AND APPARATUS FOR AUTO FOCUSING AN IMAGING DEVICE

FIELD OF THE INVENTION

The invention relates generally to a photo image capturing device and more particularly to an auto focusing technique for a photo image capturing device.

BACKGROUND OF THE INVENTION

Solid state imaging devices having pixel arrays, including charge coupled devices (CCD) and complementary metal oxide semiconductor (CMOS) devices, are commonly used in photo-imaging applications (e.g., camera). A CMOS imager circuit, for example, includes a focal plane array of pixel cells, each including a photosensor, for example, a photogate, photoconductor or a photodiode for accumulating photo-generated charge. Each pixel cell has a charge storage region, which is connected to the gate of an output transistor that is part of a readout circuit. The readout circuit connected to each pixel cell includes at least the output transistor, which receives photo-generated charges from the storage region and produces an output signal that is read-out through a pixel access transistor. In some imager circuits, each pixel may include at least one electronic device such as a transistor for transferring charge from the photosensor to the storage region and one device, also typically a transistor, for resetting the storage region to a predetermined charge level prior to charge transference.

CMOS imagers of the type generally discussed above are generally known as discussed, for example, in U.S. Pat. Nos. 6,140,630, 6,376,868, 6,310,366, 6,326,652, 6,204,524 and 6,333,205, assigned to Micron Technology, Inc., which are hereby incorporated by reference in their entirety.

Most cameras, including digital cameras, have an auto focus feature in which scenes viewed by the camera can be focused automatically. The auto focus feature can be continuous or user enabled (i.e., by depressing a button).

Currently, in one known auto focusing technique a microprocessor of an auto focus camera scans the difference in intensity among adjacent pixels to determine the best focus position of the camera's lens. If the scene is out of focus, adjacent pixels have very similar intensities. As the microprocessor moves the lens, each of the pixels are scanned to determine if the difference in intensity between adjacent pixels has improved. The microprocessor is searching for the lens position in which there is a maximum intensity difference between adjacent pixels (i.e., the best focus position of the lens).

If a scene has multiple objects that are of varying distances from the camera, it is often difficult to find the best focus position of the lens. Many of the conventional methods for seeking the best focus position are based on the average sharpness score over a frame or one window. Usually such methods do not produce the best results for a scene with two or more objects that are different distances from the camera. Sometimes, the lens position giving the maximum average sharpness for the scene may not match either one of the best focus positions for the objects in the scene. Accordingly, there is a need and a desire for a method of auto focusing a camera and its lens for multiple object scenes.

BRIEF SUMMARY OF THE INVENTION

The present invention provides a method and apparatus for accurately auto focusing a lens of an imaging device. In an exemplary embodiment, an imaged scene is split into an array of zones. The minimum and maximum sharpness score for each zone is determined over a plurality of lens positions. A histogram of the lens positions of the corresponding maximum sharpness score for each zone is created. The peak of the histogram is determined to be the best focus position for a given scene.

BRIEF DESCRIPTION OF THE DRAWINGS

The above and other advantages and features of the invention will be more clearly understood from the following detailed description which is provided in connection with the accompanying drawings, in which.

DETAILED DESCRIPTION OF THE INVENTION

Figure 1:
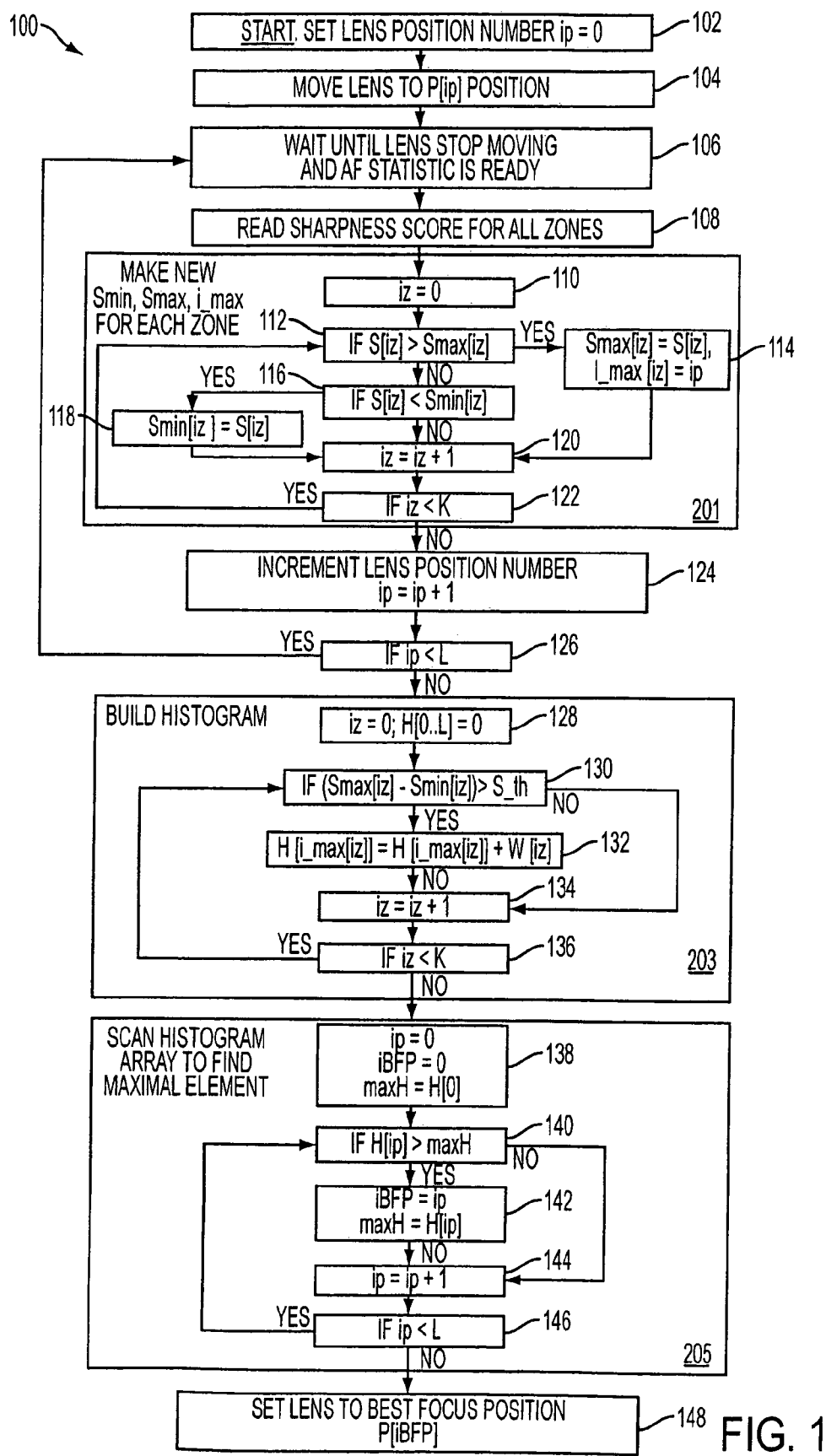
FIG. 1 illustrates an exemplary flow chart according to an embodiment of the invention.

In the following detailed description, reference is made to the accompanying drawings which form a part hereof, and in which is shown by way of illustration of specific embodiments by which the invention may be practiced. It should be understood that like reference numerals represent like elements throughout the drawings. These exemplary embodiments are described in sufficient detail to enable those skilled in the art to practice the invention. It is to be understood that other embodiments may be utilized, and that structural, logical and electrical changes may be made without departing from the spirit and scope of the present invention.

The present invention relates to a method and system for accurately and automatically focusing an imaging device having an image sensor, for example a camera. As described below in more detail the scene or part of the scene to be capture by the image sensor is split into K zones, which are organized in a M by N matrix. The number L of lens positions ip (where ip=0 ... L−1) of the camera is predetermined such that the range of nearest lens position P[0] to the furthest lens position P[L−1] is evenly covered. The nearest and furthest lens positions are preprogrammed, where the nearest (and furthest) lens position may be either closest to the object or furthest from the object depending on the preprogramming. Additionally, the maximum and minimum sharpness difference S_th is predetermined. Zones iz (where iz=0 ... K−1) having a sharpness difference (Smax[iz]−Smin[iz]) less than the sharpness threshold S_th will be discarded.

When the user is ready to take a picture, the imaging device microprocessor will scan all of the lens positions ip and record the minimum and maximum sharpness scores Smax, Smin and lens position ip for each zone K. A histogram distribution or array of the lens positions P[ip] corresponding to maximum sharpness scores from each zone iz is compiled. Each zone iz contributes proportionally to the histogram by a predetermined zone weight W[iz]. The zone weight W[iz] indicates which zones are more desirable on which to focus the lens. These zones may have a higher likelihood of having an object of the scene. The lens position of the histogram H[ip] having the maximum peak is selected as the best focus position for a given scene.

FIG. 1 illustrates an exemplary method 100 preformed by a processor of an imaging device according to an embodiment of the invention. The lens position variable ip is set to zero at step 102. Next, the lens is moved to lens position P[ip] at step 104. After the lens has stopped moving at step 106, the image is captured and a sharpness score for each zone iz is read at step 108.

In the steps carried out in processing routine 201, maximum and minimum sharpness scores Smax, Smin and the lens position corresponding to the maximum sharpness score i_max are determined and stored for each zone. For example, at step 110 the zone variable iz is set to zero. If the sharpness value S[iz] for the zone iz is greater than the maximum sharpness Smax[iz] at step 112, the maximum sharpness value Smax[iz] is set to the sharpness value S[iz] (step 114). In addition, the value of the lens position i_max[iz] corresponding to the maximum sharpness value Smax[iz] is set to the lens position ip. However, if at step 112 it is determined the sharpness value S[iz] is not greater than the maximum sharpness value Smax[iz], the sharpness value S[iz] is compared to the minimum sharpness value Smin[iz] of the zone at step 116. If at step 116 it is determined that the sharpness value S[iz] is less than the minimum sharpness value Smin[iz], or upon the completion of steps 114 or 118, the minimum sharpness value Smin[iz] is set to the sharpness value S[iz] at step 118. If the sharpness value S[iz] is not less than Smin[iz], the zone variable iz is incremented at step 120. If at step 122 zone variable iz is less than the number of zones K, the method continues at step 112 where steps 112 through 122 are repeated until the zone variable iz is not less than the number of zones K.

After the sharpness values for each zone for a lens position have been compared to the minimum and maximum sharpness values Smin[iz], Smax[iz], the lens position variable ip is incremented at step 124. If at step 126 the lens position variable is less than the total number of lens positions L, the method continues at step 106 where steps 106 through 126 are repeated as described above until the lens position variable ip is not less the number of lens position. If at step 126 the less position is not less than the number of lens positions L, the method proceeds to compute the histogram in processing routine 203.

At step 128 the zone variable iz and the histogram array H[0 . . . L] are set to zero. If the maximum sharpness score Smax[iz] for the zone minus the minimum sharpness score Smin[iz] for the zone is not greater than the predetermined threshold difference S_th (step 130), the zone variable iz is incremented (step 134). If however, the maximum sharpness score Smax[iz] minus the minimum sharpness score Smin[iz] is greater than the predetermined threshold difference S_th, (step 130) the predetermined zone weight W[iz] is added to the histogram H[i_max[iz]] corresponding to the lens position i_max [iz] which had the maximum sharpness score for the zone (step 132). The zone variable iz is incremented at step 134. If the zone variable iz is less than the number of zones K (step 136), the method continues at step 130 where steps 130 through 136 are repeated until the zone variable is not less than the number of zones K at which point the method proceeds to processing routine 205.

In processing routine 205 the histogram is scanned to determine the best lens position P[iBFP] for the scene. The lens position variable ip and the best focus position iBFP are set to zero (step 138). Additionally, the maximum histogram position value maxH is set to the histogram value for the first lens position H[0]. At step 140 the histogram value H[ip] is compared to the maximum histogram value maxH. If, at step 140, the histogram value for the lens position H[ip] is not greater than the maximum histogram value maxH, the lens position variable is incremented at step 144. If the histogram value for the lens position H[ip] is greater than the maximum histogram value maxH (step 140), the best focus position iBFP is set to the lens position ip and the maximum histogram value maxH is set to the value of H[ip] at step 142 and the method continues at step 144 where the lens position variable ip is incremented. If the lens position variable ip is less than the number of lens positions L, at step 146, the method continues at step 104 where steps 140 through 146 are repeated as described above until the lens position variable ip is not less than the number of lens positions L. Once it is determined that the lens position is not less than the number of lens positions L (step 146), the lens of the camera 309 is set to the best focus position P[iBFP] (step 148) as determined by the method 100.

It is to be understood that the invention is not limited to the implementation described above. The embodiments of the invention may be used for auto focusing a lens structure by moving a relative portion of the lens structure or the image sensor. The lens may be moved relative to the image sensor, or the image sensor may be moved relative to the lens or both lens and the image sensor may be moved in the auto focusing method and apparatus described herein. Further the lens structure may include a plurality of lenses wherein at least one lens of the structure is movable.

Figure 4A:
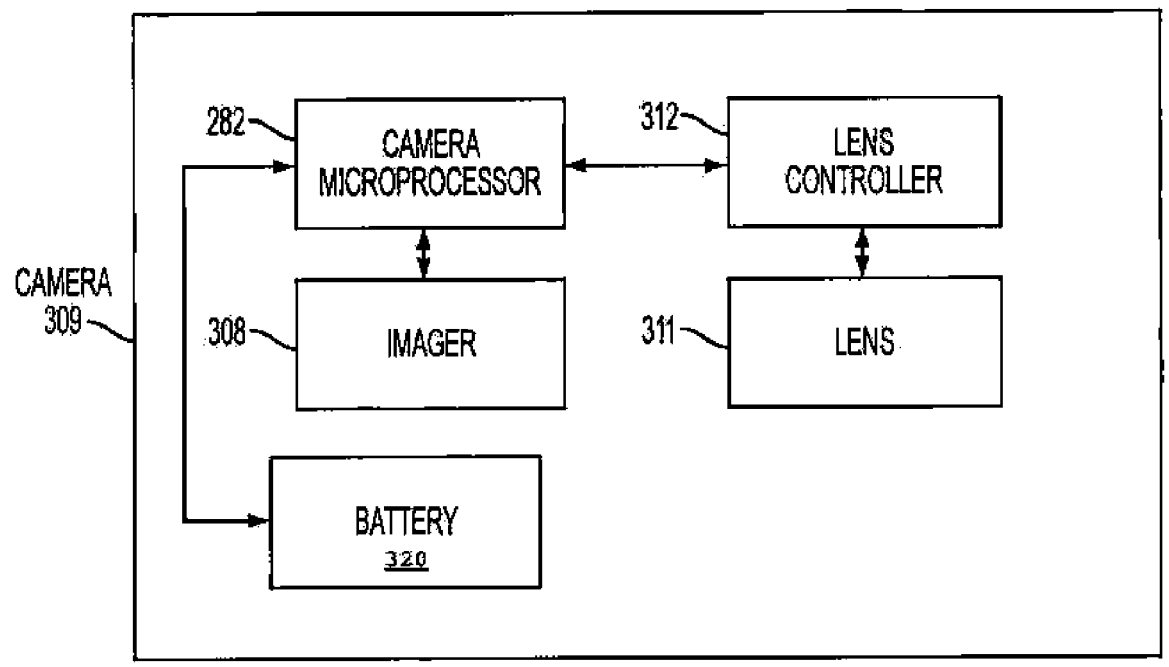
FIG. 4 illustrates exemplary internal circuitry of a digital camera constructed in accordance with embodiments of the invention.
Figure 4B:
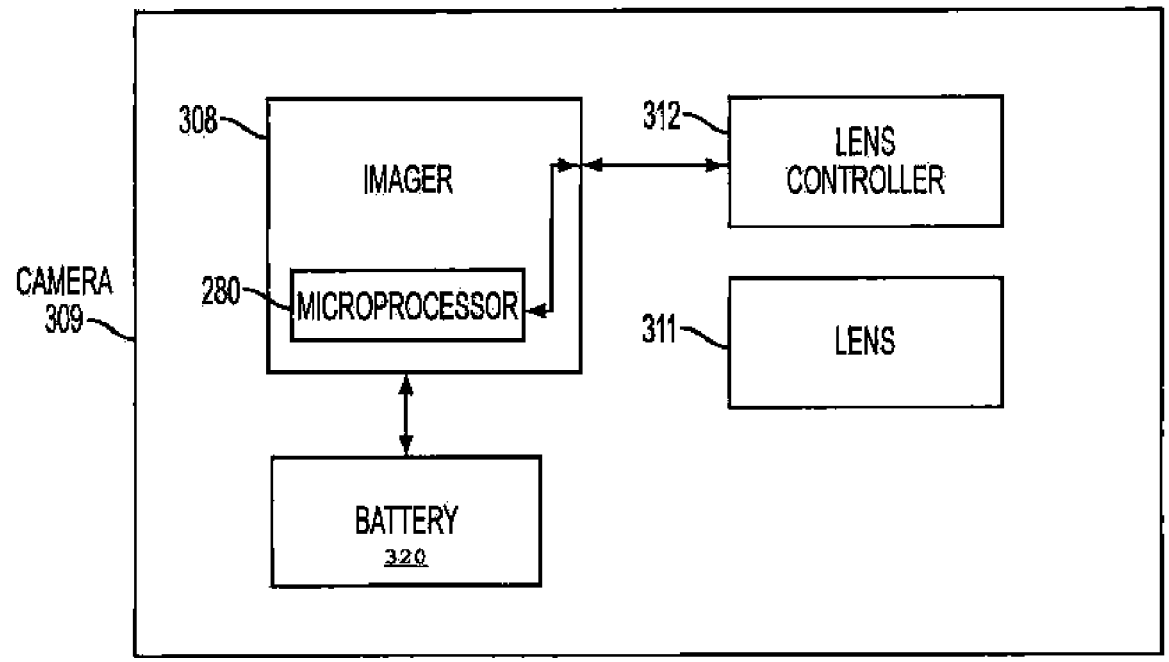

FIGS. 4A and 4B illustrate exemplary internal circuitry of a digital camera 309 constructed in accordance with exemplary embodiments of the invention. FIG. 4A illustrates the camera processor 282 communicating with a lens controller 312 which moves the lens 311. The camera processor 282 and the lens controller 312 control the movement of the lens 311 to varying focus positions in the above-described method to determine the best focus position iBFP of the lens 311. Further, after the best focus position iBFP has been determined, the processor 282 and the controller 312 control the movement of the lens 311 to that position. The imager 308 is powered by a battery 320. FIG. 4B illustrates an embodiment in which the imager processor 308 and the controller 312 control the movement of the lens 311 to determine the best focus position iBFP and move the lens 311 to that position.

Figure 2:
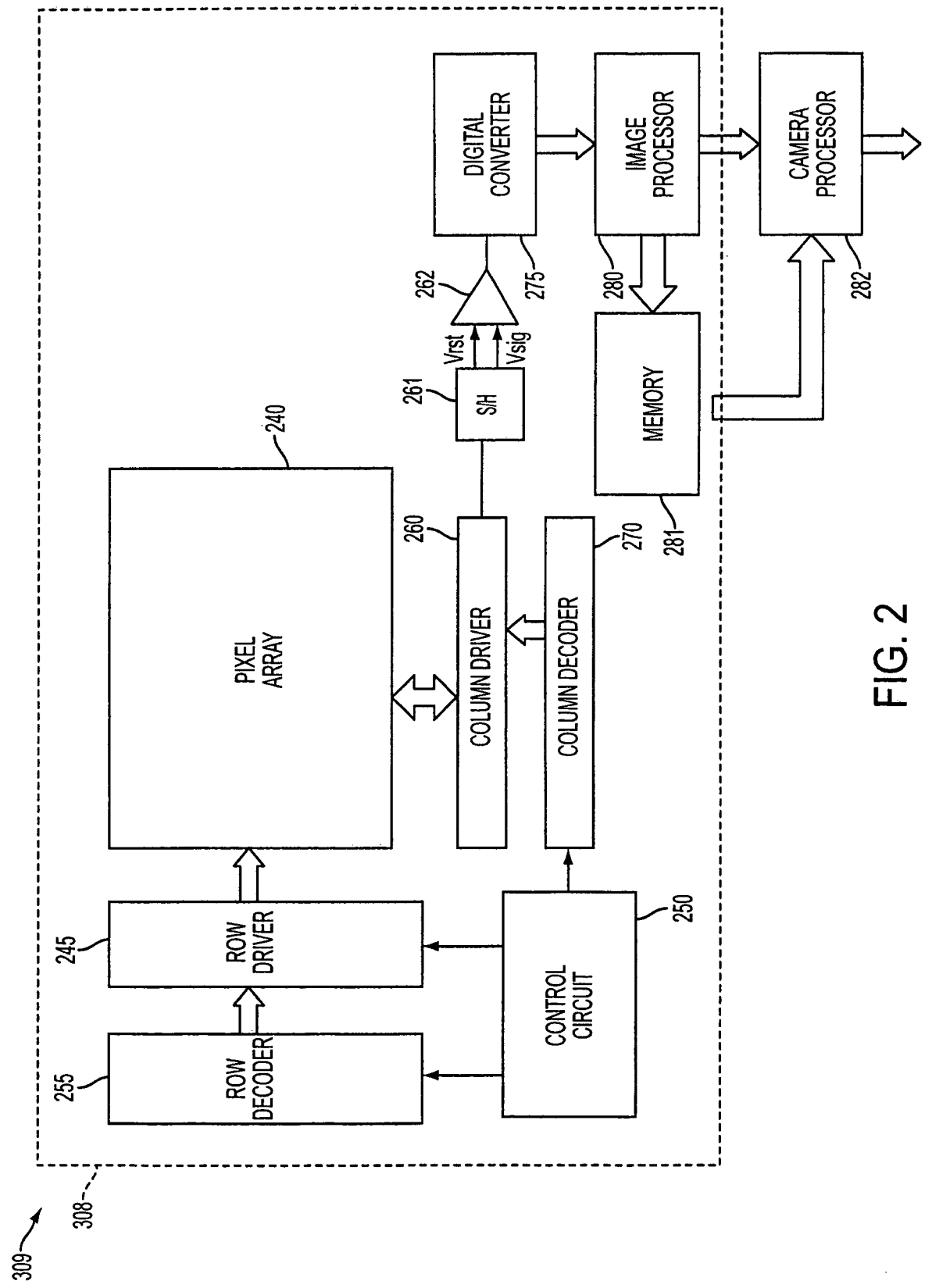
FIG. 2 illustrates a block diagram of an exemplary imaging device that can be used to practice the invention.

An exemplary digital camera 309, for carrying out the embodiments described above, employing a solid state CMOS imager is illustrated in FIG. 2. As shown, the exemplary CMOS imager 308 has a pixel array 240 comprising a plurality of pixels arranged in a predetermined number of columns and rows. Attached to the array 240 is signal processing circuitry. The pixels of each row in array 240 are all turned on at the same time by a row select line, and the pixels of each activated row are selectively output by respective column select lines. A plurality of row and column select lines are provided for the entire array 240. The row lines are selectively activated by a row driver 245 in response to row address decoder 255. The column select lines are selectively activated by a column driver 260 in response to column address decoder 270. Thus, a row and column address is provided for each pixel.

The CMOS imager 308 is operated by the timing and control circuit 250, which controls address decoders 255, 270 for selecting the appropriate row and column lines for pixel readout. The control circuit 250 also controls the row and column driver circuitry 245, 260 such that they apply driving voltages to the drive transistors of the selected row and column select lines. The pixel column signals, which for a CMOS imager typically include a pixel reset signal ($V_{rst}$) and a pixel image signal ($V_{sig}$), are read by a sample and hold circuit 261. $V_{rst}$ is read from a pixel immediately after a charge storage region is reset. $V_{sig}$ represents the amount of charges generated by the pixel's photosensitive element and stored in the charge storage region in response to applied light to the pixel. A differential signal ($V_{rst}$–$V_{sig}$) is produced by differential amplifier 262 for each pixel. The differential signal is digitized by analog-to-digital converter 275 (ADC). The analog-to-digital converter 275 supplies the digitized pixel signals to an image processor 280, which forms and outputs a digital image. Either the image processor 280 or the camera processor 282 may run the method described above with reference to FIG. 1. A memory 281 is typically associated with the image processor 280 and/or camera processor 282 for storing the digital image. Alternatively separate memories may be respectively associated with each of the processors 280, 282.

Figure 3:
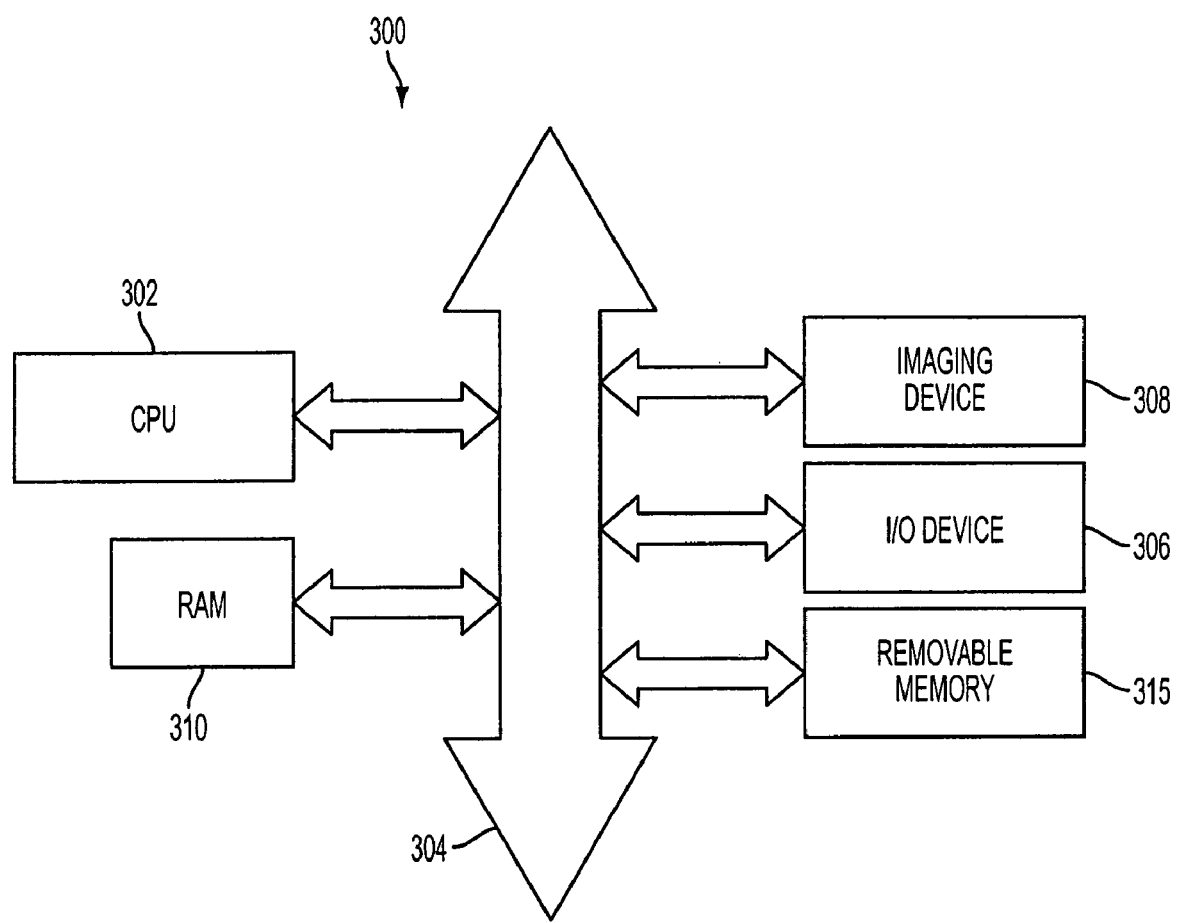
FIG. 3 illustrates an exemplary processor system for executing the embodiments of the invention.

FIG. 3 illustrates a typical processor system 300, which may be used, for example, in the camera system 309 illustrated in FIG. 2, including an imaging device 308. System 300, for implementing the above-described embodiments, generally comprises a central processing unit (CPU) 302, such as a microprocessor 280, that communicates with an input/output (I/O) device 306 over a bus 304. Imaging device 308 also communicates with the CPU 302 over the bus 304. The processor-based system 300 also includes random access memory (RAM) 310, and can include removable memory 315, such as flash memory, which also communicate with the CPU 302 over the bus 304. The imaging device 308 may be combined with a processor, such as a CPU, digital signal processor, or microprocessor, with or without memory storage on a single integrated circuit or on a different chip than the processor.

It is to be understood that the invention is not limited to the implementation described above. For example, some of the embodiments described above employ variables which are incremented up, however, it is contemplated that the variables may also be implemented by counting down to a preset number.

The processes and devices described above illustrate exemplary methods and devices of many that could be used to implement the invention. The above description and drawings illustrate exemplary embodiments of the present invention. However, it is not intended that the present invention be strictly limited to the above-described and illustrated embodiments and is only limited by the scope of the appended claims.

What is claimed as new and desired to be protected by Letters Patent of the United States is:

1. A method of determining a focus position of a lens structure relative to an imaging sensor, comprising the steps of:
    dividing a scene imaged by said sensor into zones;
    reading sharpness values for every zone for each of a predetermined number of lens positions;
    determining a minimum sharpness value for each zone;
    determining a maximum sharpness value for each zone;
    determining a focus position giving the maximum sharpness score for each zone;
    building a histogram based on the positions providing the maximum sharpness values, wherein the step of building the histogram further comprises the steps of:
        setting a predetermined threshold value; and
        incorporating the peak zone sharpness value into the histogram if the difference between the minimum and maximum sharpness value is greater than the threshold value; and
    determining a focus position in accordance with the contents of said histogram.

2. A method of determining a focus position of a lens structure relative to an imaging sensor, comprising:
    dividing a scene imaged by said sensor into zones;
    reading sharpness values for every zone for each of a predetermined number of lens positions;
    determining a minimum sharpness value for each zone;
    determining a maximum sharpness value for each zone;
    determining a focus position giving the maximum sharpness score for each zone;
    building a histogram based on the positions providing the maximum sharpness values;
    determining a focus position in accordance with the contents of said histogram;
    setting the lens structure relative to the sensor to the position corresponding to the position of the histogram with the peak sharpness value; and
    moving the position of the sensor relative to the lens structure.

3. A method of determining a focus position of a lens structure relative to an imaging sensor comprising:
    dividing a scene imaged by said sensor into zones;
    assigning a predetermining weight for each of said zones;
    determining a minimum sharpness value for each zone;
    determining a maximum sharpness value for each zone;
    determining a focus position giving the maximum sharpness score for each zone;
    generating a histogram based on the positions providing the maximum sharpness values, further comprising the steps of:
        calculating the difference between each minimum and maximum sharpness values for each zone and comparing the difference to a predetermined threshold;
        if the calculated difference is larger than the predetermined threshold, adding to the histogram the predetermined weight for the zone; and
        determining the position in the histogram with the largest value, wherein the lens structure relative to the sensor corresponding to the largest value is the best focus position for the lens structure.

4. The method according to claim 3, further comprising the step of automatically focusing said imaging device by setting the lens structure relative to the sensor corresponding to said best focus position.

5. A method of determining a focus position of a camera lens structure relative to an image sensor location comprising:
    dividing an image scene into a plurality of zones, each zone comprising a plurality of pixels;
    determining the best focus position for each of said plurality of zones; and
    identifying a best focus position satisfying a maximum number of zones.

6. The method according to claim 5, further comprising the step of auto focusing the lens by setting the lens structure relative to the sensor to the best focus position.

7. The method according to claim 4, further comprising the steps of:
    setting predetermined weights for each zone; and
    incorporating the predetermined zone weights into the histogram.

8. An apparatus for determining the best relative focus position of a lens structure and image sensor, said apparatus comprising:
    a sensor for sensing an image through said lens structure; and
    a controller system coupled to said sensor for receiving an image and determining said best focus position, said controller system operating to:

divide an image scene into a plurality of zones, each zone comprising a plurality of pixels;

determine a best focus position for each of said plurality of zones; and identify the best focus position satisfying a maximum number of zones.

9. The apparatus of claim 8, wherein the controller system further operates to set the lens to the best focus position.

10. The apparatus of claim 9, wherein the controller system further operates to:

set predetermined weights for each of said plurality of zones; and incorporate the predetermined zone weights into the identification of the zone with the best focus position.

11. The apparatus of claim 9, wherein the controller system further operates to move the position of at least one lens of the lens structure relative to the sensor.

12. The apparatus of claim 9, wherein the controller system further operates to move the position of the sensor relative to the lens structure.

13. An apparatus comprising:

a processor; and a program for operating said processor to:

divide a scene imaged by a sensor into a plurality of zones, each zone comprising a plurality of pixels;

determine a best focus position for each of said plurality of zones; and identify the best focus position satisfying a maximum number of zones.

14. The apparatus of claim 13, wherein the program further operates to set the lens to the best focus position.

15. The apparatus of claim 14, wherein the program further operates to:

set predetermined weights for each of said plurality of zones; and incorporate the predetermined zone weights into the identification of the best focus position.

16. The apparatus of claim 14, wherein the program further operates to move the position of at least one lens of the lens structure relative to the sensor.

17. The apparatus of claim 14, wherein the program further operates to move the position of the sensor relative to the lens structure.

18. A storage medium comprising:

a program for operating a processor to determine a relative focus position of a lens structure and image sensor, said program causing said processor to:

divide an image scene into a plurality of zones, each zone comprising a plurality of pixels;

determine a best focus position for each of said plurality of zones; and identify the best focus position satisfying a maximum number of zones.

19. The storage medium of claim 18, wherein the program further operates to set the lens to the best focus position.

20. The storage medium of claim 19, wherein the program further operates to:

set predetermined weights for each of said plurality of zones; and incorporate the predetermined zone weights into the identification of the best focus position.

21. The storage medium of claim 19, wherein the program further operates to move the position of at least one lens of the lens structure relative to the sensor.

22. The storage medium of claim 19, wherein the program further operates to move the position of the sensor relative to the lens structure.

* * * * *

UNITED STATES PATENT AND TRADEMARK OFFICE
CERTIFICATE OF CORRECTION

PATENT NO.         : 7,639,937 B2                                      Page 1 of 1
APPLICATION NO.    : 11/176284
DATED              : December 29, 2009
INVENTOR(S)        : Igor Subbotin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 846 days.

Signed and Sealed this

Ninth Day of November, 2010

David J. Kappos
*Director of the United States Patent and Trademark Office*